US009796928B2

(12) United States Patent
Yang et al.

(10) Patent No.: US 9,796,928 B2
(45) Date of Patent: Oct. 24, 2017

(54) FUNCTIONAL MATERIAL, ITS PREPARATION METHOD, ALIGNMENT MATERIAL, AND LIQUID CRYSTAL DISPLAY SUBSTRATE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN); Zhenpeng Guo, Beijing (CN); Jing Su, Beijing (CN); Jiantao Liu, Beijing (CN); Hongbo Feng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/769,586

(22) PCT Filed: Nov. 21, 2014

(86) PCT No.: PCT/CN2014/091838
§ 371 (c)(1),
(2) Date: Aug. 21, 2015

(87) PCT Pub. No.: WO2016/015409
PCT Pub. Date: Feb. 4, 2016

(65) Prior Publication Data
US 2016/0280998 A1 Sep. 29, 2016

(30) Foreign Application Priority Data

Jul. 29, 2014 (CN) .......................... 2014 1 0366432

(51) Int. Cl.
G02B 5/23 (2006.01)
G02F 1/1337 (2006.01)
(Continued)

(52) U.S. Cl.
CPC ................ C09K 19/56 (2013.01); C09C 1/00 (2013.01); C09C 3/10 (2013.01); G02F 1/1337 (2013.01);
(Continued)

(58) Field of Classification Search
CPC ............... C09K 19/56; G02F 1/133723; G02F 1/133719; C09D 7/1216; H05K 9/0092; B29D 7/01
(Continued)

(56) References Cited

U.S. PATENT DOCUMENTS 4,879,182 A    11/1989 Presswood et al.
4,996,293 A *   2/1991 Tsuyoshi .............. C08G 73/106
                                               524/607
(Continued)

FOREIGN PATENT DOCUMENTS

CN         1656148 A      8/2005
CN       101805517 A      8/2010
(Continued)

OTHER PUBLICATIONS

International Search Report & Written Opinion Appln. No. PCT/CN2014/091838; Dated May 6, 2015.
First Chinese Office Action Appln. No. 201410366432.4; Dated Jul. 28, 2015.

*Primary Examiner* — Bijan Ahvazi
(74) *Attorney, Agent, or Firm* — Ladas & Parry LLP

(57) ABSTRACT

The present invention provides a functional material, its preparation method, an alignment material and a liquid crystal substrate, which belong to the display technical field and can solve the problem that current liquid crystal display (Continued)

devices will produce pollution. The functional material of the present invention comprises an inorganic powder whose surface has a modified layer, wherein the inorganic powder comprises any one or more of aluminum oxide, magnesium oxide, zinc oxide, zirconium oxide, silicon dioxide, titanium dioxide, boron oxide, diiron trioxide, calcium oxide, potassium oxide, sodium oxide and lithium oxide; the modified layer is generated via cyclization by dehydrating the reaction product of a dianhydride and a diamine. The alignment material of the present invention comprises the above functional material. The liquid crystal display substrate of the present invention comprises an alignment layer made from the above alignment material.

9 Claims, 1 Drawing Sheet

(51) Int. Cl.
*C09K 19/56* (2006.01)
*C09C 3/10* (2006.01)
*C09C 1/00* (2006.01)
*G02F 1/1335* (2006.01)

(52) U.S. Cl.
CPC .. *G02F 1/133719* (2013.01); *G02F 1/133723* (2013.01)

(58) Field of Classification Search
USPC ............ 252/583, 586; 349/106, 123; 430/7; 264/78; 428/327; 524/606
See application file for complete search history.

(56) References Cited

U.S. PATENT DOCUMENTS

| | | | | |
|---|---|---|---|---|
| 5,693,379 | A | * 12/1997 | Sugimori | ............... C08G 73/10 428/1.26 |
| 2003/0181626 | A1 | 9/2003 | Lindway | |
| 2013/0150523 | A1 | 6/2013 | Xiao et al. | |
| 2013/0158195 | A1 | 6/2013 | Chen et al. | |
| 2014/0184997 | A1 | 7/2014 | Yan et al. | |
| 2014/0220335 | A1* | 8/2014 | Lin | ...................... H05K 9/0084 428/327 |
| 2015/0331315 | A1* | 11/2015 | Yang | ...................... C08L 75/16 430/281.1 |

FOREIGN PATENT DOCUMENTS

| | | | |
|---|---|---|---|
| CN | 102039100 A | 5/2011 | |
| CN | 102634020 A | 8/2012 | |
| CN | 102643424 A | 8/2012 | |
| CN | 102707496 A | 10/2012 | |
| CN | 102707503 A | 10/2012 | |
| CN | 102898833 A | 1/2013 | |
| CN | 103059298 A | 4/2013 | |
| CN | 103160123 A | 6/2013 | |
| CN | 103232609 A | 8/2013 | |
| CN | 103555003 A | 2/2014 | |
| CN | 103739205 A | 4/2014 | |
| EP | 0646632 A1 | 5/1995 | |
| JP | 0551541 A | 3/1993 | |
| JP | 2002-285031 A | 10/2002 | |
| JP | 2005-231934 A | 9/2005 | |
| JP | 2007-254523 | * 4/2007 | ............ C08G 69/26 |
| JP | 2007-254523 A | 10/2007 | |
| WO | 2013003397 | 1/2013 | |

* cited by examiner

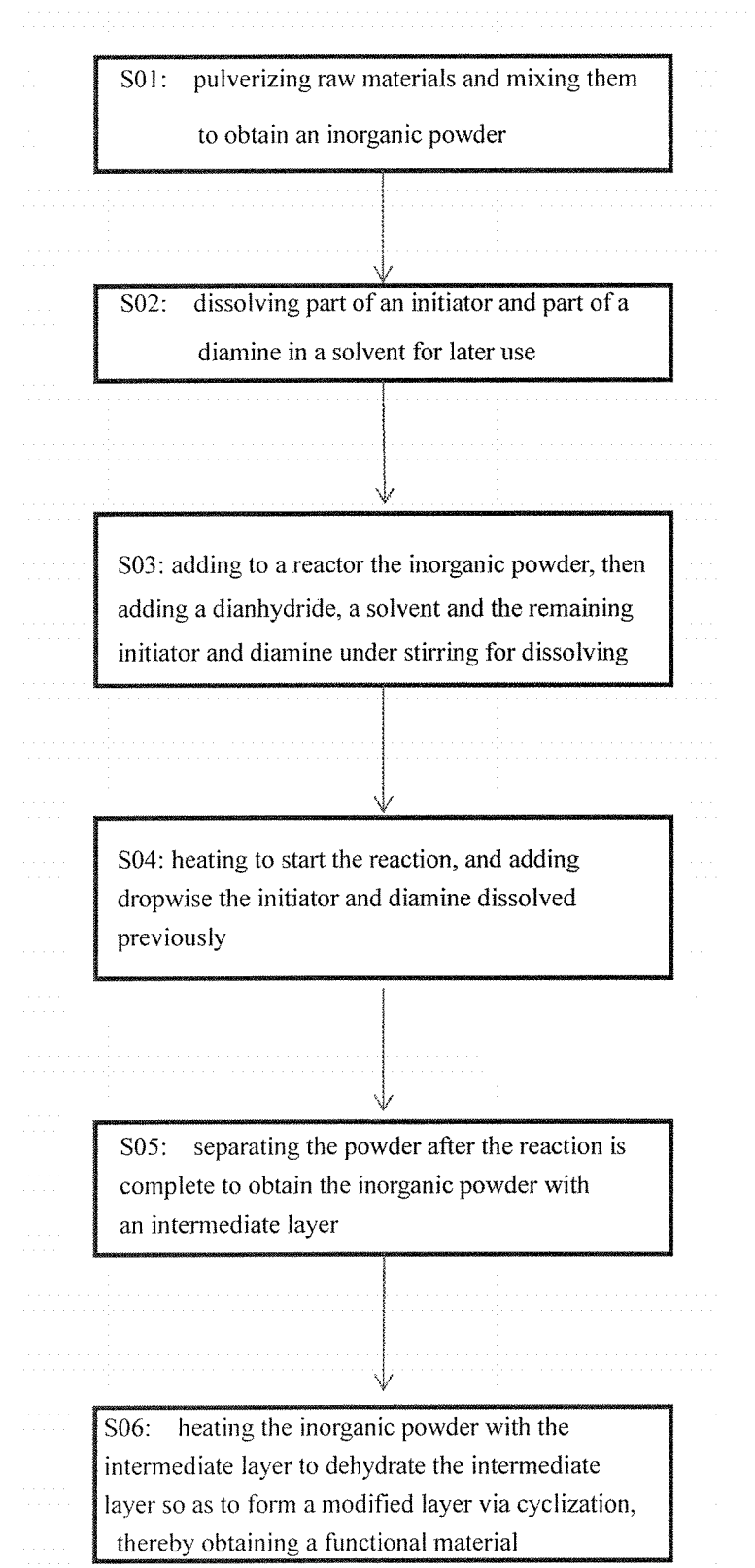

FUNCTIONAL MATERIAL, ITS PREPARATION METHOD, ALIGNMENT MATERIAL, AND LIQUID CRYSTAL DISPLAY SUBSTRATE

TECHNICAL FIELD

The present invention relates to the display technical field, in particular to a functional material, its preparation method, an alignment material, and a liquid crystal display substrate.

BACKGROUND

In liquid crystal display devices, an alignment layer is one of the important structures and may achieve specific orientation structures after friction or UV irradiation, so that the liquid crystal molecules in contact therewith are arranged (i.e., oriented) according to a specific direction to achieve the object of filtering light using liquid crystal.

The alignment layer is typically located in a liquid crystal display substrate (such as an array substrate, or a color filter substrate) and is a cover on all the other display structures such as a thin film transistor array, a pixel electrode, a color filter film and the like. The alignment layer is formed by curing an alignment material comprising a polyimide, a crosslinking agent, a solvent, and the like.

Liquid crystal display devices will inevitably produce some electromagnetic radiation during use, resulting in adverse effects on human health.

SUMMARY OF THE INVENTION

Regarding the problem that current liquid crystal display devices will produce pollution, the present invention provides an environmentally friendly functional material which can play a role in heath care and a method for preparing the same, as well as an alignment material and a liquid crystal display substrate.

One technical solution employed to address a technical problem of the present invention is a functional material comprising an inorganic powder whose surface has a modified layer, wherein the inorganic powder comprises any one or more of aluminum oxide, magnesium oxide, zinc oxide, zirconium oxide, silicon dioxide, titanium dioxide, boron oxide, diiron trioxide, calcium oxide, potassium oxide, sodium oxide and lithium oxide; and the modified layer is generated via cyclization by dehydrating the reaction product of a dianhydride and a diamine.

For example, the molar ratio of the dianhydride to the diamine for generating the modified layer is between 0.85:1 and 1.05:1.

More preferably, the molar ratio of the dianhydride to the diamine for generating the modified layer is between 0.92:1 and 1.05:1.

For example, the dianhydride for generating the modified layer comprises at least one phenyl group, and the diamine for generating the modified layer comprises at least one phenyl ring or at least one non-phenyl six-membered carbocyclic ring.

More preferably, the dianhydride for generating the modified layer is selected from any one of pyromellitic dianhydride, trimellitic anhydride, benzophenone dianhydride, biphenyl dianhydride, diphenyl ether dianhydride, and 4,4'-(hexafluoroisopropylidene) diphthalic anhydride (also named as hexafluoro dianhydride); and the diamine for generating the modified layer is selected from any one of 3-amino-benzylamine, 2,2'-difluoro-4,4'-(9-fluorenylidene) dianiline, 2,2-bis(3-amino-4-hydroxyphenyl) hexafluoropropane, hexahydro-m-xylylene diamine, 1,4-bis(aminomethyl)cyclohexane, 2,2-bis[4-(4-aminophenoxy)phenyl] hexafluoropropane, 2,2-bis(3-amino-4-methylphenyl) hexafluoropropane, 2,2-bis(3-aminophenyl) hexafluoropropane, 2,2-bis(4-aminophenyl) hexafluoropropane, 2,7-diamino-fluorene, m-xylylene diamine, and 4,4'-methylene bis(2-ethyl-6-methylaniline).

For example, the inorganic powder has a particle diameter of 1 to 5000 nm.

One technical solution employed to solve a technical problem of the present invention is a method for preparing the above functional material, comprising:
S1. mixing the inorganic powder, the dianhydride, and the diamine with an initiator and a solvent uniformly;
S2. reacting the dianhydride with the diamine by heating to form an intermediate layer on the surface of the inorganic powder; and
S3. heating the inorganic powder with the intermediate layer to dehydrate the intermediate layer, thereby obtaining the functional material via cyclization.

For example, the mass ratio of the inorganic powder to the substance generated by the reaction of the dianhydride and the diamine is between 20:1 and 1:1.

For example, the heating in the step S2 comprises two stages: heating at a temperature of 35 to 70° C. for 20 to 40 min; and heating at a temperature of 70 to 100° C. for 20 to 40 min.

For example, the heating in the step S3 comprises heating at a temperature of 50 to 300° C. for 30 to 60 min.

One technical solution employed to solve a technical problem of the present invention is an alignment material comprising: a polyimide; a coupling agent; a solvent; and the above functional material.

For example, without calculating the mass of the modified layer in the functional material, the mass percentages of the components in the alignment material are: 1 to 20% of the polyimide; 0.1 to 5% of the coupling agent; 72.5 to 98% of the solvent; and 0.1 to 2.5% of the inorganic powder in the functional material.

More preferably, without calculating the mass of the modified layer in the functional material, the mass percentage of the inorganic powder in the functional material is 0.1 to 2.0% based on the alignment material.

More preferably, without calculating the mass of the modified layer in the functional material, the mass percentage of the inorganic powder in the functional material is 0.1 to 1.8% based on the alignment material.

The expression herein "without calculating the mass of the modified layer in the functional material, the mass percentage of a certain substance in the alignment material" refers to the mass percentage of a certain substance in the case that the sum of the mass of all substances (inorganic powder of the functional material, polyimide, coupling agent, solvent and the like) in the alignment material except the modified layer in the functional material is 100%.

One technical solution employed to solve a technical problem of the present invention is a liquid crystal display substrate, comprising an alignment layer which is obtained by curing the above alignment material.

Functional materials of the present invention can emit far-infrared light and negative ions. Far-infrared light, after being absorbed by a human body, can allow water molecules in the body to resonate and be activated, which enhances the intermolecular bonding force, thereby activating proteins and other biological macromolecules and bringing the organism cells to the highest vibration level. Furthermore, far-infrared heat can be transferred to a subcutaneous deeper part, thus increasing the temperature of the subcutaneous deeper part, expanding the capillaries, promoting the blood circulation, strengthening the metabolism among tissues, promoting a tissue regeneration capacity, enhancing the organism immunity, and bringing the vivacity. On the other hand, negative ions can decompose and oxidize bacteria and organic substances, and may serve the function of disinfection and sterilization and produce the effect of improving air quality. Therefore, the functional material may play a role in health care and is environmentally friendly.

The surface of the inorganic powder in the functional material of the present invention has a modified layer which can bond well to the primary ingredient (polyimide) of the alignment material, so that the functional material can be stably distributed in the alignment layer; and the modified layer can further improve the ability of the inorganic powder to emit far-infrared light and negative ions.

The liquid crystal display substrate of the present invention has an alignment layer generated from the above alignment material, and therefore can constantly emit far-infrared light and negative ions during use and is environmentally friendly.

BRIEF DESCRIPTION OF THE DRAWING

FIG. 1 is a flow chart of a method for preparing a functional material according to an embodiment of the present invention.

DETAILED DESCRIPTION

To enable those skilled in the art to better understand the technical solution of the present invention, further detailed descriptions are made for the present invention with reference to the drawings and embodiments.

The present embodiment provides a functional material and a method for preparing the same.

The functional material comprises an inorganic powder whose surface has a modified layer, wherein the inorganic powder comprises any one or more of aluminum oxide, magnesium oxide, zinc oxide, zirconium oxide, silicon dioxide, titanium dioxide, boron oxide, diiron trioxide, calcium oxide, potassium oxide, sodium oxide and lithium oxide; and the modified layer is generated via cyclization by dehydrating the reaction product of a dianhydride and a diamine.

The particle diameter of the inorganic powder is from nanometers to micrometers, specifically, for example, from 1 to 5000 nm, preferably from 10 to 500 nm. The particle diameter can be measured, for example by a Malvern laser particle size analyzer.

Dianhydride herein refers to a substance containing at least two anhydride groups in the molecular structure; while diamine herein refers to a substance containing at least two amine groups (or amino groups) in the molecular structure.

The dianhydride, for example, contains at least one phenyl group, and is preferably any one of pyromellitic dianhydride, trimellitic anhydride, benzophenone dianhydride, biphenyl dianhydride, diphenyl ether dianhydride, and 4,4'-(hexafluoroisopropylidene) diphthalic anhydride (also named as hexafluoro dianhydride).

The diamine, for example, contains at least one phenyl ring or at least one non-phenyl six-membered carbocyclic ring (e.g. cyclohexyl), and is preferably any one of 3-aminobenzyl amine, 2,2'-difluoro-4,4'-(9-fluorenylidene) dianiline, 2,2-bis(3-amino-4-hydroxyphenyl) hexafluoropropane, hexahydro-m-xylylene diamine, 1,4-bis(aminomethyl) cyclohexane, 2,2-bis[4-(4-aminophenoxy)phenyl] hexafluoropropane, 2,2-bis(3-amino-4-methylphenyl) hexafluoropropane, 2,2-bis(3-aminophenyl) hexafluoropropane, 2,2-bis(4-aminophenyl) hexafluoropropane, 2,7-diaminofluorene, m-xylylene diamine, and 4,4'-methylene bis(2-ethyl-6-methylaniline).

The molar ratio of the dianhydride to the diamine is from 0.85:1 to 1.05:1, preferably from 0.92:1 to 1.05:1.

The dianhydride and the diamine are reacted to form a layer of product (an intermediate layer) on the surface of the inorganic powder. Then the layer of product is subjected to dehydration to obtain the above modified layer via cyclization. The modified layer can be well bonded to the primary ingredient (polyimide) in the alignment material so that the functional material can be stably distributed in the alignment layer; and the modified layer can improve the inorganic powder's capacity to emit far-infrared light and negative ions.

Functional materials of the present embodiment can emit far-infrared light and negative ions. Far-infrared light, after being absorbed by a human body, can allow water molecules in the body to resonate and be activated, which enhances the intermolecular bonding force, thereby activating proteins and other biological macromolecules and bringing the organism cells to the highest vibration level. Furthermore, far-infrared heat can be transferred to a subcutaneous deeper part, thus increasing the temperature of the subcutaneous deeper part, expanding the capillaries, promoting the blood circulation, strengthening the metabolism among tissues, promoting a tissue regeneration capacity, enhancing the organism immunity, and bringing the vivacity. On the other hand, negative ions can decompose and oxidize bacteria and organic substances, and may serve the function of disinfection and sterilization and produce the effect of improving air quality. Therefore, the functional material may play a role in health care and is environmentally friendly.

The method for preparing the above functional material comprises: mixing the inorganic powder, the dianhydride, and the diamine with an initiator and a solvent uniformly; and reacting the dianhydride with the diamine by heating to form an intermediate layer on the surface of the inorganic powder; and heating the inorganic powder with the intermediate layer to dehydrate the intermediate layer so as to obtain the functional material via cyclization.

To be specific, as shown in FIG. 1, the above preparation method may comprise:

S01, in the case of using a dispersant, pulverizing the raw materials respectively into powder and mixing the same uniformly in proportion, or mixing the raw materials in proportion uniformly and then pulverizing the same, to yield an inorganic powder.

The dispersant may be chosen from conventional dispersants such as BYK 161 manufactured by BYK Additives & Instruments and Solsperse 32500 and Solsperse 22000 manufactured by The Lubrizol Corporation. Pulverization may be carried out using conventional methods such as ball milling, grinding, and the like. As the inorganic powder may be prepared by existing methods, no further details will be provided herein.

S02, dissolving from a fourth to a third of an initiator and from a fourth to a third of a diamine in a solvent for later use.

The mass ratio of the inorganic powder to the substance generated by the reaction of the dianhydride and the diamine is from 20:1 to 1:1.

That is to say, the amounts of the dianhydride and the diamine are determined as follows: assuming a complete reaction between the dianhydride and the diamine to yield a resultant, if the mass of the resultant is 1, then the mass of the inorganic powder is between and 20. Such an amount can ensure that a modifier layer with a suitable thickness can be obtained on the inorganic powder.

An initiator is used to initiate the reaction, which, for example, is a nitrogen-based initiator, preferably any one of azo bisisobutyronitrile, 2,2'-azo bis(2,4-dimethylvaleronitrile), dimethyl azo bisisobutyrate, and azo bisisovaleronitrile.

The solvent can be selected from fatty alcohols, glycol ethers, ethyl acetate, methyl ethyl ketone, methyl isobutyl ketone, ethylene glycol monomethyl ether ester, γ-butyrolactone, ethyl 3-ethoxypropionate, butyl carbitol, butyl carbitol acetate, propylene glycol monomethyl ether, propylene glycol monomethyl ether acetate, cyclohexane, xylene, isopropanol, and other conventional organic solvents. Since the solvent merely serves to disperse various substances, propylene glycol monomethyl ether acetate is used as a solvent in the process of specifically preparing the functional material in all the Examples.

S03, adding the inorganic powder to a reaction vessel (e.g., a four-neck flask) which is then subjected to stirring, shocking, shaking and the like; afterwards, adding the dianhydride and the solvent as well as the remaining initiator and diamine and allowing them to be dissolved uniformly.

S04, heating to carry out the reaction so as to form the intermediate layer on the surface of the inorganic powder, for example in two stages which specifically comprise heating at a temperature of 35 to 70° C. for 20 to 40 min; and then continuing heating at a temperature of 70 to 100° C. for 20 to 40 min.

During the above heating process, the dianhydride and the diamine are allowed to react, thereby generating the intermediate layer on the surface of the inorganic powder; wherein the heating is carried out in two stages so as to prevent the reaction from being too severe.

During the reaction process, the above solution prepared by dissolving an initiator and a diamine is gradually added dropwise to a four-neck flask so as to prevent the reaction from being too severe.

The reaction in this step may be carried out, for example, under the protection of nitrogen, and for example under constant stirring.

The solvent in each step is in an amount sufficient to disperse and dissolve the substances therein uniformly, and the initiator is in an amount sufficient to initiate the reaction, which can be adjusted by those skilled in the art based on the actual conditions, and thus no further detail is given herein. However, the mass ratio (all referring to the total amount) of the inorganic powder, the initiator and the solvent is generally 1:(from 0.25 to 0.4):(from 1 to 1.5). To achieve consistency in the process of preparing the functional material in the various Examples, the mass ratio of the inorganic powder, the initiator and the solvent is 1:0.3:1.4.

S05, after the reaction is over, separating the powder to obtain an inorganic powder with an intermediate layer. In other words, the inorganic powder with an intermediate layer is separated from the solution by filtering, evaporating the solvent, etc S06, heating the inorganic powder with the intermediate layer to dehydrate the intermediate layer so as to form a modified layer via cyclization, thereby obtaining the functional material.

In another word, the inorganic powder is further heated to dehydrate the intermediate layer and allow it to be cyclized, yielding a modified layer well compatible with polyimide.

For example, heating in the step S06 is carried out at a temperature of 50° C. to 300° C. for 30 to 60 min.

Of course, it should be appreciated that the preparation method described above may also undergo many changes, for example, the dianhydride, the diamine, the initiator and the like can all be dissolved in a solvent once; for another example, heating in step S04 can be carried out in one section. After all, any variation is allowed as long as the dianhydride and the diamine can react to form a modified layer on the surface of the inorganic powder.

The present embodiment further provides an alignment material.

The alignment material is used for forming an alignment layer in a liquid crystal display substrate, comprising a polyimide, a solvent, a coupling agent, and the above functional material.

For example, without calculating the mass of the modified layer in the functional material, the mass percentages of the components in the alignment material are: 1 to 20% of the polyimide; 0.1 to 5% of the coupling agent; 72.5 to 98% of the solvent; 0.1 to 2.5% of the inorganic powder in the functional material.

Without calculating the mass of the modified layer in the functional material, the mass percentage of (the inorganic powder in) the functional material in the alignment material is preferably 0.1 to 2.0%, and more preferably 0.1 to 1.8%.

In another word, the contents of the components are as above if the sum of the mass of all substances (the inorganic powder, the polyimide, the coupling agent, and the solvent of the functional material) in the alignment material except the modified layer in the functional material is 100%.

The polyimide is the primary ingredient for forming an alignment layer and its content is for example 1 to 15%, preferably 1 to 10%.

A coupling agent is used for cross-linking the polyimide to generate a solid alignment layer. The coupling agent may be a silane coupling agent, a nitrogen silane coupling agent, or a phenoxy silane coupling agent, such as vinylsilane, aminosilane, epoxy silane, mercaptosilane and methacryloxysilane or the like, and its content is for example 0.1 to 5%, preferably 0.1 to 3%.

A solvent is used for dissolving and dispersing the components in the alignment material so as to form a uniform and stable system. The solvent can be selected from an organic solvent, such as N-methyl-2-pyrrolidone, m-cresol, γ-butyrolactone, N,N-dim ethylacetamide, N,N-dimethylformamide, N-methyl caprolactam, dimethyl sulfoxide, γ-butyrolactam, ethylene glycol monomethyl ether, ethylene glycol monoethyl ether, ethylene glycol monopropyl ether, ethylene glycol monobutyl ether, diethylene glycol monobutyl ether, diethylene glycol monoethyl ether, butyl carbitol, ethyl carbitol actate, ethylene glycol and the like.

After being incorporated into an alignment material, the above functional material can improve the environmental friendliness of the alignment material.

The functional materials of various Examples were prepared using the above preparation method according to the parameters in the following table.

Afterwards, an alignment material was further prepared using the functional material obtained according to the parameters in the following table as long as various components were mixed uniformly without the need to employ a specific adding sequence and a specific mixing method.

Subsequently, the infrared emissivity of the alignment material was measured according to the GB/T 7287-2008 standard, and the amount of anions produced thereby was measured using an air anion analyzer (for example, Japan KEC Corporation's KEC-900 type), the results being as shown in the following table.

Finally, an alignment layer was formed by curing the alignment material and its voltage holding ratio was measured. Specifically, the alignment material was spin-coated on a substrate whose surface had an indium tin oxide (ITO) layer, prebaked at 80° C. for 2 min, post-baked at 220° C. for 20 min, and then subjected to directional friction at a rotating speed of 1200 rpm and a platform moving speed of 50 mm/s with an indentation depth of 0.3 mm. A liquid crystal cell was formed using the substrate. The liquid crystal cell was charged by applying a pulse voltage (5V, 60μ), and then the change in voltage of the liquid crystal cell within 16.7 ms was measured using a high-speed voltmeter wherein the percentage of the maintained voltage was recorded as a voltage holding ratio.

In various Examples, JSR OPTMER AL23201 manufactured by JSR Corporation was used as a polyimide; γ-aminopropyl triethoxysilane was used as a coupling agent; and γ-butyrolactone was used as a solvent. Being conventional components in an alignment material, the above materials were consistently used for experimentation to achieve comparability of the results.

TABLE 1

Relevant parameters of the functional material and the alignment material (content unit: by mass parts)

| Item | | Example 1 | 2 | 3 | 4 | 5 | 6 | 7 | 8 | 9 | 10 | 11 |
|---|---|---|---|---|---|---|---|---|---|---|---|---|
| Inorganic powder | aluminum oxide amount | 0.002 | None | 0.014 | 0.019 | 0.024 | 0.029 | 0.033 | 0.038 | 0.043 | 0.048 | 0.06 |
| | titanium oxide Amount | 0.056 | 0.224 | 0.337 | 0.449 | 0.561 | 0.025 | 0.786 | 0.898 | 1.01 | 1.122 | 1.402 |
| | zirconium oxide amount | 0.031 | 0.088 | 0.126 | 0.168 | 0.21 | 0.252 | 0.294 | 0.336 | 0.378 | 0.42 | 0.525 |
| | silicon oxide amount | None | 0.04 | 0.06 | 0.08 | 0.16 | 0.12 | 0.14 | 0.16 | 0.18 | 0.2 | 0.25 |
| | boron oxide amount | 0.009 | 0.025 | 0.036 | 0.048 | None | 0.72 | 0.084 | 0.096 | 0.108 | 0.12 | 0.15 |
| | diiron trioxide amount | None | 0.012 | 0.018 | 0.024 | 0.03 | 0.054 | 0.042 | 0.048 | 0.054 | 0.06 | 0.075 |
| | sodium oxide amount | 0.002 | 0.011 | 0.009 | 0.012 | 0.015 | None | 0.021 | 0.024 | 0.027 | 0.03 | 0.038 |
| | Total amount | 0.1 | 0.4 | 0.6 | 0.8 | 1 | 1.2 | 1.4 | 1.6 | 1.8 | 2 | 2.5 |
| Type of dianhydride | | Pyromellitic dianhydride | Pyromellitic dianhydride | diphenyl ether dianhydride | Pyromellitic dianhydride | diphenyl ether dianhydride | Hexafluoro dianhydride | Hexafluoro dianhydride | diphenyl ether dianhydride | Hexafluoro dianhydride | Hexafluoro dianhydride | Hexafluoro dianhydride |
| Type of diamine | | 3-amino benzyl amine | m-xylylene diamine | m-xylylene diamine | 3-Amino benzylamine | m-xylylene diamine | 3-Amino benzylamine | m-xylylene diamine | 2,7-diamino fluorene | m-xylylene diamine | 2,7-diamino fluorene | m-xylylene diamine |
| Molar ratio of dianhydride to diamine | | 0.85 | 0.87 | 0.92 | 1 | 1.05 | 1.05 | 1 | 0.9 | 0.9 | 0.85 | 0.92 |
| Mass ratio of inorganic powder to reaction product | | 20 | 10 | 8 | 15 | 1 | 4 | 20 | 1 | 7.5 | 16 | 16 |

TABLE 1-continued

Relevant parameters of the functional material and the alignment material (content unit: by mass parts)

| Item | | 1 | 2 | 3 | 4 | 5 | 6 | 7 | 8 | 9 | 10 | 11 |
|---|---|---|---|---|---|---|---|---|---|---|---|---|
| Initiator | | Azodiiso butyronitrile | Azodiiso butyronitrile | Azobisiso valeronitrile | Azobisiso valeronitrile | Azodiiso butyronitrile | Azodiiso butyronitrile | Dimethyl azobis isobutyrate | Azodiiso butyronitrile | Azobisiso valeronitrile | Azobisiso valeronitrile | Dimethyl azobis isobutyrate |
| Heating temp. at the first stage (° C.) | | 35 | 40 | 70 | 60 | 50 | 55 | 55 | 65 | 70 | 35 | 30 |
| Heating time at the first stage (min) | | 40 | 40 | 20 | 25 | 30 | 25 | 30 | 35 | 35 | 35 | 20 |
| Heating temp. at the second stage (° C.) | | 75 | 85 | 75 | 80 | 70 | 90 | 90 | 100 | 95 | 70 | 80 |
| Heating time at the second stage (min) | | 40 | 25 | 30 | 35 | 40 | 30 | 20 | 20 | 25 | 35 | 40 |
| Heating temp. of dehydration and cyclization (° C.) | | 50 | 300 | 150 | 220 | 120 | 110 | 250 | 80 | 200 | 260 | 270 |
| Heating time of dehydration and cyclization (min) | | 60 | 30 | 45 | 35 | 50 | 50 | 40 | 60 | 45 | 35 | 30 |
| Amount of polyimide | | 1 | 20 | 14 | 10 | 5 | 15 | 20 | 14 | 18 | 19 | 19 |
| Amount of coupling agent | | 0.9 | 4 | 5 | 3 | 1 | 5 | 4 | 4 | 3.5 | 5 | 5 |
| Amount of solvent | | 98 | 75.6 | 80.4 | 86.2 | 93.0 | 78.8 | 74.6 | 80.4 | 76.7 | 74.0 | 73.5 |
| performance | Infrared emissivity (%) | 50 | 62 | 83 | 90 | 91 | 92 | 93 | 94 | 95 | 96 | 99 |
| | Anions (number/cm³) | 120 | 470 | 700 | 920 | 1150 | 1500 | 1590 | 1800 | 2000 | 2200 | 2700 |
| | Voltage holding ratio (%) | 99.2 | 99 | 98.8 | 98.2 | 97.6 | 97.2 | 96.8 | 96.5 | 96.1 | 93.8 | 94.2 |

It can be seen that the alignment materials of various Examples have high infrared emissivity and anion concentration, and the alignment layers generated therefrom have a good voltage holding ratio, which suggests that the properties of the alignment layer itself are not affected. Meanwhile, the alignment layer can produce far-infrared light and negative ions, thereby improving the environment.

The surface of the inorganic powder in the functional material of the present embodiment has a modified layer capable of allowing the inorganic powder to be well compatible with the alignment material and improving the inorganic powder's capacity to emit far-infrared light and negative ions.

The present embodiment further provides a liquid crystal display substrate, comprising an alignment layer made from the above alignment material; wherein the liquid crystal display substrate can be an array substrate or a color filter substrate, and may further comprise other display structures such as a thin film transistor array, a pixel electrode, a color filter film and the like, which are covered with the alignment layer.

The alignment material is formed into an alignment layer mainly by heating and curing, where the specific curing method and parameters are known and thus will not be further described in detail herein.

The liquid crystal display substrate of the present embodiment comprises an alignment layer generated from the above alignment material, and therefore can constantly emit far-infrared light and negative ions during use and is environmentally friendly.

It should be appreciated that the above embodiments are merely exemplary embodiments to illustrate the principles of the present invention, but the present invention is not limited thereto. Those of ordinary skill in the art, without departing from the spirit and essence of the present invention, may make various changes and improvements. Such changes and improvements are deemed within the scope of the invention.

The present application claims the priority of the Chinese Patent Application No. 201410366432.4 filed on Jul. 29, 2014, which is incorporated herein by reference as part of the present application.

What is claimed is:

1. An alignment material, consisting of:
   a polyimide;
   a coupling agent;
   a solvent; and
   a functional material comprising an inorganic powder whose surface has a modified layer, wherein the inorganic powder comprises any one or more of aluminum oxide, magnesium oxide, zinc oxide, zirconium oxide, silicon dioxide, titanium dioxide, boron oxide, diiron trioxide, calcium oxide, potassium oxide, sodium oxide and lithium oxide; and the modified layer is generated via cyclization by dehydrating the reaction product of a dianhydride and a diamine;
   without calculating the mass of the modified layer in the functional material, the mass percentages of the components in the alignment material are:
   the polyimide: 1 to 20%;
   the coupling agent: 0.1 to 5%;
   the solvent: 72.5 to 95%; and
   the inorganic powder in the functional material: 0.1 to 2.5%;
   the above percentages are based on the sum of the mass of the polyimide, the coupling agent, the solvent, and the inorganic powder except the modified layer in the functional material.

2. The alignment material according to claim 1, wherein without calculating the mass of the modified layer in the functional material, the mass percentage of the inorganic powder in the functional material is 0.1 to 2.0% based on the alignment material.

3. The alignment material according to claim 2, wherein without calculating the mass of the modified layer in the functional material, the mass percentage of the inorganic powder in the functional material is 0.1 to 1.8% based on the alignment material.

4. A liquid crystal display substrate comprising an alignment layer, wherein the alignment layer is obtained by curing the alignment material according to claim 1.

5. The alignment material according to claim 1, wherein the molar ratio of the dianhydride to the diamine for generating the modified layer is between 0.85:1 and 1.05:1.

6. The alignment material according to claim 5, wherein the molar ratio of the dianhydride to the diamine for generating the modified layer is between 0.92:1 and 1.05:1.

7. The alignment material according to claim 1, wherein the dianhydride for generating the modified layer comprises at least one phenyl; and
the diamine for generating the modified layer comprises at least one phenyl ring or at least one non-phenyl six-membered carbocyclic ring.

8. The alignment material according to claim 7, wherein the dianhydride for generating the modified layer is selected from the group consisting of pyromelliticdianhydride, trimellitic anhydride, benzophenone dianhydride, biphenyl dianhydride, diphenyl ether dianhydride, and 4,4'-(hexafluoroisopropylidene)diphthalic anhydride; and
the diamine for generating the modified layer is selected from the group consisting of 3-amino benzylamine, 2,2'-difluoro-4,4'-(9-fluorenylidene) dianiline, 2,2-bis (3-amino-4-hydroxy phenyl) hexafluoropropane, hexahydro-m-xylylene diamine, 1,4-bis(aminomethyl) cyclohexane, 2,2-bis[4-(4-aminophenoxy)phenyl] hexafluoropropane, 2,2-bis(3-amino-4-methylphenyl) hexafluoropropane, 2,2-bis(3-aminophenyl) hexafluoropropane, 2,2-bis(4-aminophenyl) hexafluoropropane, 2,7-diaminofluorene, m-xylylene diamine, and 4,4'-methylene bis(2-ethyl-6-methylaniline).

9. The alignment material according to claim 1, wherein the inorganic powder has a particle diameter of 1 to 5000 nm.

* * * * *